United States Patent
Gupta et al.

(10) Patent No.: US 11,895,102 B2
(45) Date of Patent: Feb. 6, 2024

(54) IDENTITY MANAGEMENT

(71) Applicant: Nutanix, Inc., San Jose, CA (US)

(72) Inventors: Vinod Gupta, Fremont, CA (US); Sunil Chandrabhan Agrawal, Fremont, CA (US)

(73) Assignee: Nutanix, Inc., San Jose, CA (US)

( * ) Notice: Subject to any disclaimer, the term of this patent is extended or adjusted under 35 U.S.C. 154(b) by 551 days.

(21) Appl. No.: 16/947,442

(22) Filed: Jul. 31, 2020

(65) Prior Publication Data

US 2021/0297398 A1    Sep. 23, 2021

Related U.S. Application Data

(60) Provisional application No. 63/038,545, filed on Jun. 12, 2020, provisional application No. 62/991,741, filed on Mar. 19, 2020.

(51) Int. Cl.
*H04L 9/40* (2022.01)
*H04L 41/084* (2022.01)
(Continued)

(52) U.S. Cl.
CPC .......... *H04L 63/08* (2013.01); *G06F 9/45558* (2013.01); *H04L 41/0846* (2013.01);
(Continued)

(58) Field of Classification Search
CPC ............. G06F 2009/4557; G06F 16/27; G06F 16/2358; H04L 67/1001; H04L 63/08;
(Continued)

(56) References Cited

U.S. PATENT DOCUMENTS 8,549,518 B1    10/2013    Aron et al.
8,601,473 B1    12/2013    Aron et al.
(Continued)

FOREIGN PATENT DOCUMENTS

JP    2002132568 A    *    5/2002

OTHER PUBLICATIONS

Katsikogiannis et al., "UACS:Towards unified access control services", 2015 IEEE International Symposium on Signal Processing and Information Technology (ISSPIT), Dec. 7, 2015, IEEE Publishing.*

(Continued)

*Primary Examiner* — Todd L Barker
(74) *Attorney, Agent, or Firm* — Vista IP Law Group, LLP

(57) ABSTRACT

An identity authentication management (IAM) service is established as a master over a master identity database of the centralized identity authentication management service. When adding an additional node to the computing infrastructure, a non-master copy of the master identity database is distributed to the additional node. Ongoing coordination between the master identity database and the non-master copy is established so as to synchronize differences between the master identity database and the non-master copy of the identity database. The additional node hosts a fully-functional authentication management service using the non-master copy of the master identity database and is able to respond to READ requests for data by accessing the non-master copy—without interaction with the centralized identity authentication management service.

24 Claims, 11 Drawing Sheets

(51) Int. Cl.
 G06F 9/455 (2018.01)
 H04L 67/1001 (2022.01)
(52) U.S. Cl.
 CPC ...... H04L 63/0209 (2013.01); H04L 63/0281 (2013.01); H04L 67/1001 (2022.05); *G06F 2009/4557* (2013.01)
(58) Field of Classification Search
 CPC ............. H04L 63/0209; H04L 63/0281; H04L 63/0876
 See application file for complete search history.

(56) References Cited

U.S. PATENT DOCUMENTS

| | | | |
|---|---|---|---|
| 8,850,130 B1 | 9/2014 | Aron et al. | |
| 9,772,866 B1 | 9/2017 | Aron et al. | |
| 11,249,952 B1* | 2/2022 | Andrews | G06F 16/16 |
| 11,372,634 B1* | 6/2022 | Gabrielson | H04L 67/1031 |
| 2010/0153742 A1* | 6/2010 | Kuo | H04J 3/0667 713/189 |
| 2014/0040196 A1* | 2/2014 | Wijayaratne | G06F 16/11 707/624 |
| 2014/0126416 A1* | 5/2014 | Yu | H04W 4/021 370/254 |
| 2018/0189311 A1* | 7/2018 | Newhouse | G06F 21/554 |
| 2019/0312857 A1* | 10/2019 | Lander | H04W 12/63 |
| 2020/0257700 A1* | 8/2020 | Xu | G06F 8/65 |
| 2020/0329034 A1* | 10/2020 | Kasravi | G06F 11/2023 |
| 2021/0044540 A1* | 2/2021 | Rushton | H04L 47/782 |

OTHER PUBLICATIONS

Faraji et al., "Identity access management for Multi-tier cloud infrastructures", 2014 IEEE Network Operations and Management Symposium, May 5, 2014, IEEE Publishing.*
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Poitras, Steven. "The Nutanix Bible" (Jul. 9, 2019), from https://nutanixbible.com/ (Publication date based on indicated capture date by Archive.org; first publication date unknown).
Poitras, Steven. "The Nutanix Bible" (Feb. 3, 2020), from https://nutanixbible.com/ (Publication date based on indicated capture date by Archive.org; first publication date unknown).
Poitras, Steven. "The Nutanix Bible" (Aug. 1, 2020), from https://nutanixbible.com/ (Publication date based on indicated capture date by Archive.org; first publication date unknown).
Poitras, Steven. "The Nutanix Bible" (Jan. 30, 2021), from https://nutanixbible.com/ (Publication date based on indicated capture date by Archive.org; first publication date unknown).
Cano, I. et al., "Curator: Self-Managing Storage for Enterprise Clusters", *14th USENIX Symposium on Networked Systems Design and Implementation, NSDI '17*, (Mar. 27, 2017).
"Empower Business Teams with Self-service IAM," PingCentral SolutionBrief, dated Sep. 24, 2019.
Tatkar, V., "Oracle Management Cloud for Oracle Identity and Access Management," dated Dec. 6, 2018.
"Overview of Identity and Access Management," Oracle, date found via Internet Archive as Mar. 8, 2021.
"SAP Cloud Platform Identity Authentication Service," SAP Administration Guide, dated Mar. 25, 2020.
"Chapter 38. Failover, load balancing and high availability in Identity Management," Red Hat Customer Portal, date found via Internet Archive as Jul. 16, 2019.
"Chapter 4. Installing and Uninstalling Identity Management Replicas," Red Hat Customer Portal, date found via Internet Archive as Jul. 16, 2019.
Gonzalez, N., et al., "A Framework for Authentication and Authorization Credentials in Cloud Computing," 12th IEEE International Conference on Trust, Security and Privacy in Computing and Communications, dated Jul. 2013.
Abbadi, I., et al., "A framework for establishing trust in the Cloud," Computers & Electrical Engineering, vol. 38, Issue 5, Sep. 2012, pp. 1073-1087.
Varia, J., "Architecting for the Cloud: Best Practices," Amazon Web Services, dated Jan. 2011.
Bajaber, W., et al., "Different Techniques to Ensure High Availability in Cloud Computing," International Journal of Advanced Research in Computer and Communication Engineering, vol. 6, Issue 11, Nov. 2017.
"Identity Federation," Meshcloud, copyright 2020.
Kleyman, B., "The importance of identity federation in the cloud," TechTarget, dated Jul. 13, 2011.
"Administering Oracle Identity Cloud Service: Understand App Gateway," Oracle Help Center, date found via Internet Archive as Sep. 20, 2020, URL: https://docs.oracle.com/en/cloud/paas/identity-cloud/uaids/understand-app-gateway.html.
Toal, P., "Extending SSO beyond your cloud apps: Quickly and Easily," Oracle Cloud Security, dated Apr. 19, 2018, URL: https://blogs.oracle.com/cloudsecurity/extending-sso-beyond-your-cloud-apps%3a-quickly-and-easily.
Toal, P., "Why is Hybrid Identity and Access Management Important?," Oracle Cloud Security, dated Jul. 19, 2018, URL: https://blogs.oracle.com/cloudsecurity/post/why-is-hybrid-identity-and-access-management-important.
"Manage Identities Across the Hybrid Cloud," Oracle, date found via Google as Nov. 18, 2018.
Iyer, S., "Enabling Hybrid Identities across Cloud and On-premises applications using IDCS," Oracle Cloud Security, dated URL: Sep. 6, 2016, URL: https://blogs.oracle.com/cloudsecurity/post/enabling-hybrid-identities-across-cloud-and-on-premises-applications-using-idcs.
"Secure and Manage Hybrid Clouds," Oracle Cloud, date found via Google as Dec. 8, 2018.
"Oracle Identity Cloud Service: Integrating with Oracle Identity Manager (OIM)," Oracle Help Center, date found via Internet Archive as Jul. 10, 2018, URL: https://www.oracle.com/webfolder/technetwork/tutorials/obe/cloud/idcs/idcs_oim_obe/oim.html.
"Security Overview," Oracle Help Center, dated Dec. 2021, URL: https://docs.oracle.com/en/cloud/paas/data-safe/admds/security-overview.html#GUID-A7AA99A1-A8EF-45B3-A61C-E304C5D06B49.

(56) References Cited

OTHER PUBLICATIONS

Poitras, Steven. "The Nutanix Bible" (Sep. 9, 2022), from https://nutanixbible.com/ (Publication date based on indicated capture date by Archive.org; first publication date unknown).

"Citrix XenDesktop 7.1 on Microsoft Hyper-V Server 2012 R2 on Nutanix Virtual Computing Platform—Solution Design," Citrix Validated Solutions, Prepared by: Citrix APAC Solutions, dated Jun. 25, 2014.

* cited by examiner

IDENTITY MANAGEMENT

RELATED APPLICATIONS

The present application claims the benefit of priority to U.S. Patent Application Ser. No. 63/038,545 titled "IDENTITY MANAGEMENT", filed on Jun. 12, 2020, which is hereby incorporated by reference in its entirety; and the present application claims the benefit of priority to U.S. Patent Application Ser. No. 62/991,741 titled "IDENTITY MANAGEMENT", filed on Mar. 19, 2020, which is hereby incorporated by reference in its entirety.

TECHNICAL FIELD

This disclosure relates to identity authentication services, and more particularly to techniques for identity management in hybrid cloud settings.

BACKGROUND

In a public cloud environment, typically each availability zone (AZ) is isolated from other data centers so that an outage in one availability zone does not cause availability problems in other zones. However, for certain critical services such as identity authentication management, customers sometimes want a centralized approach, where identity and access management policies can be programmed, monitored and configured from one central location, thereby limiting the amount of administrative work to be performed to only the one centralized site.

Different cloud providers (e.g., public cloud providers) often implement their own specific (and possibly different) offerings/approaches, some example of which are described below.

One particular approach might be to offer a "global service". This means that an identity access management (IAM) service is provided for global access. It is configured at one central location (e.g., which might be designated as global data center). This suffers from the risk of downtime should there be an outage that affects the global access.

Another, different approach might be to implement multiple sites where the IAM services are hosted, and from where the IAM database is administered. This approach suffers from a lack of scalability. Specifically, this multiple site approach incurs unscalable demands on IT staff (and others) to maintain these multiple sites and to administrate additions, deletions and other changes that would need to be applied to the multiple IAM databases.

Unfortunately, the heretofore-attempted approaches have many deficiencies. Merely as illustrative examples of such deficiencies, mere copying of identity data from one site to another site suffers from the ongoing need for the various copies of the identity data to be managed from each location—incurring a lot of IT resources and the risk of misconfigurations. Also, mere centralization of the identity data fails to provide sufficiently high ongoing availability due to the possibility of a failure of the central node that hosts the centralized identity data. Moreover, in architectures that involve centralization of the identity data, multiple-hop network latency is incurred for IAM operations. In some situations, this latency can be non-negligible.

What is needed is a way to provide high availability of federated identity data and corresponding identity management services in a manner that can be deployed into a hybrid cloud setting. Moreover, what is needed is a way to provide for high-availability across multiple availability zones.

SUMMARY

This summary is provided to introduce a selection of concepts that are further described elsewhere in the written description and in the figures. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

The present disclosure describes techniques used in systems, methods, and in computer program products for identity management, which techniques advance the relevant technologies to address technological issues with legacy approaches. More specifically, the present disclosure describes techniques used in systems, methods, and in computer program products for identity management in hybrid cloud settings. Certain embodiments are directed to technological solutions for automatically deploying and updating multiple identity authentication services across multiple availability zones.

The disclosed embodiments modify and improve over legacy approaches. In particular, the herein-disclosed techniques provide technical solutions that address the technical problems attendant to avoiding a single point of failure when providing identity authentication services. Such technical solutions involve specific implementations (i.e., data organization, data communication paths, module-to-module interrelationships, etc.) that relate to the software arts for improving computer functionality.

Many of the herein-disclosed embodiments for automatically managing multiple identity authentication services across multiple availability zones are technological solutions pertaining to technological problems that arise in the hardware and software arts that underlie hybrid on-premises/cloud deployments. Aspects of the present disclosure achieve performance and other improvements in peripheral technical fields including, but not limited to, computing cluster management and database table manipulation.

Some embodiments include a sequence of instructions that are stored on a non-transitory computer readable medium. Such a sequence of instructions, when stored in memory and executed by one or more processors, causes the one or more processors to perform a set of acts for automatically managing multiple identity authentication services across multiple availability zones.

Some embodiments include the aforementioned sequence of instructions that are stored in a memory, which memory is interfaced to one or more processors such that the one or more processors can execute the sequence of instructions to cause the one or more processors to implement acts for automatically managing multiple identity authentication services that include identity authentication services that are deployed into both cloud infrastructure and on-premises computing clusters.

In various embodiments, any combinations of any of the above can be combined to perform any variations of acts for identity management in hybrid cloud settings, and many such combinations of aspects of the above elements are contemplated.

Further details of aspects, objectives and advantages of the technological embodiments are described herein, and in the figures and claims.

BRIEF DESCRIPTION OF THE DRAWINGS

The drawings described below are for illustration purposes only. The drawings are not intended to limit the scope of the present disclosure.

DETAILED DESCRIPTION

Figure 1A:
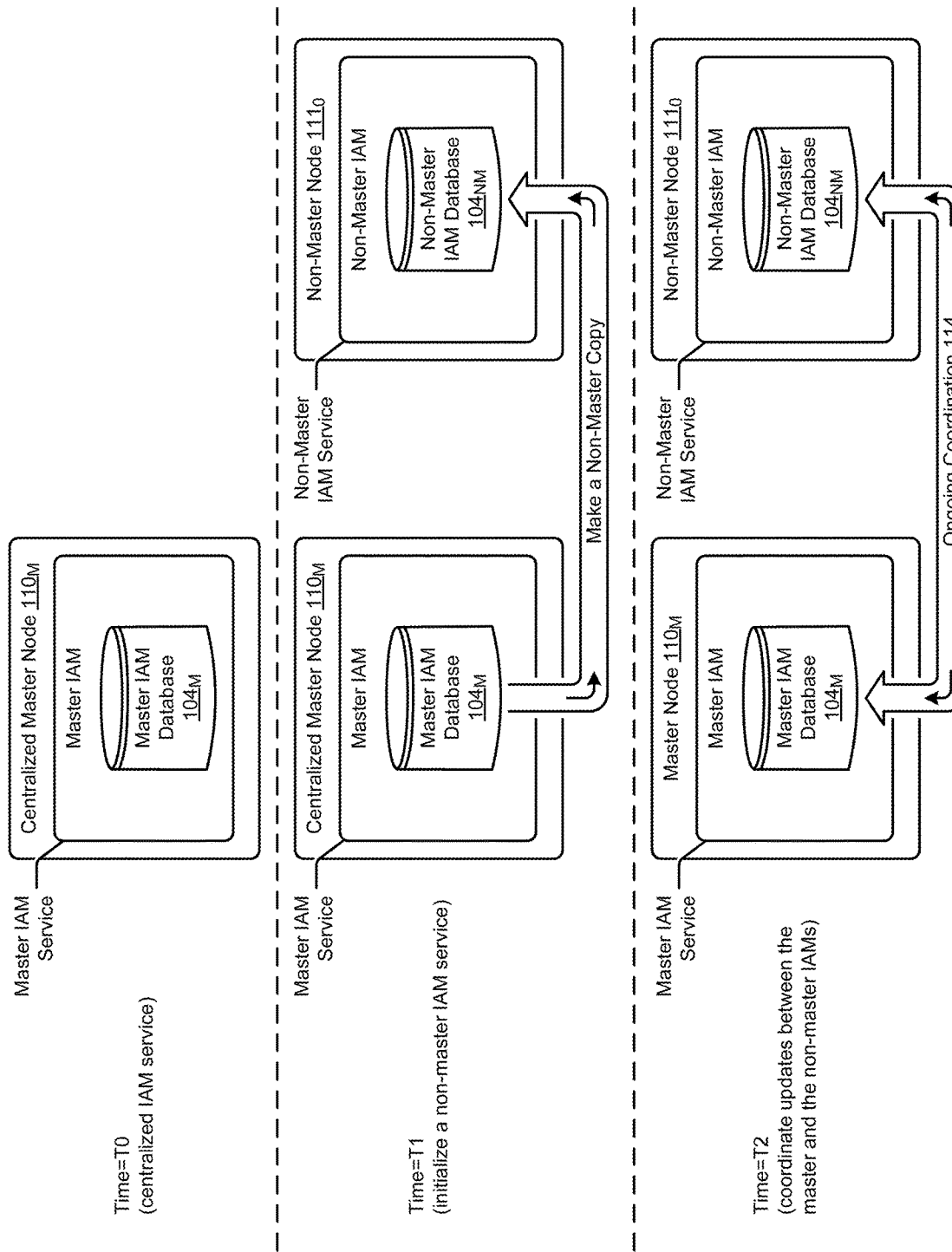
FIG. 1A shows deployment of a system having two fully-functional IAM services in a master/non-master relationship, according to an embodiment.

Aspects of the present disclosure solve problems associated with using computer systems for avoiding a single point of failure when providing fully-functional, high-performance identity authentication services. These problems are unique to, and may have been created by, various computer-implemented methods for avoiding a single point of failure when providing identity authentication services in the context of hybrid on-premises/cloud deployments. Some embodiments are directed to approaches for automatically managing multiple identity authentication services in hybrid topologies (e.g., hybrid on-premises/cloud topologies). Some embodiments are directed to approaches for automatically managing multiple fully-functional identity authentication services across multiple availability zones. The accompanying figures and discussions herein present example environments, systems, methods, and computer program products for identity management in hybrid cloud settings.

Overview

Identity management, also known as identity and access management (IAM), is a framework of policies and technologies for ensuring that certain actors (e.g., people and programs) have appropriate access to technology resources. IAM systems authenticate and authorize actors before granting access. Identity and access management solutions have become more prevalent and critical in recent years as regulatory compliance requirements have become increasingly more rigorous and complex. The terms "identity management" and "identity and access management" are used interchangeably herein. An identity management system addresses ongoing computing issues such as (1) how users gain an identity, (2) assignment of authenticatable roles, and (3) granting of permissions. In some cases identity management systems address ongoing computing issues such as how to protect an actor's identity and how to make use of the technologies that support such protection (e.g., network protocols, digital certificates, passwords, etc.).

The present disclosure, in combination with the figures, provides several techniques and implementations that implement fully-featured identity and access management services while avoiding the pitfalls of prior approaches. More specifically, the present disclosure provides solutions to various problems that arise in the context of hybrid topologies. In some cases, these hybrid topologies involve combinations of an on-premises computing clusters, public computing clouds, private computing clouds, and remote/branch office computing equipment.

In any possible combination of the foregoing, the computing equipment needs to exhibit high availability, even if/when some component or components in the topology are even temporarily "down" or "disconnected" or otherwise "unavailable". Strictly as an example scenario that is addressed by the present disclosure, any remote office/branch office (ROBO) needs to provide local identity services to local processes—even if the ROBO becomes disconnected from other components in the hybrid topology.

Another aspect that is addressed by the present disclosure is automation of configuration and/or reconfiguration of an IAM. Specifically, users and/or IT professionals do not want to repeatedly perform IAM configuration steps whenever the computing topology changes. Moreover, users and/or IT professionals do not want to repeatedly perform IAM configuration steps when a new identity is added (e.g., to accommodate a new employee) or deleted (e.g., to accommodate a retired or released employee), or to accommodate adoption of public cloud services. As such, the present disclosure includes techniques whereby a particular IAM configuration, together with its corresponding policies, can be automatically replicated as needed (e.g., when a ROBO topology changes and/or as a public cloud service is added).

What is needed is a way to deploy multiple IAMs throughout a topology, yet without the need for the identity data to be managed from each location, which incurs a lot of IT resources and risk of misconfigurations. Furthermore, what is needed is a way to deploy multiple IAMs such that each site implements a fully-functional, high-performance and up-to-date IAM that can provide local IAM services even in the presence of network and/or peer system failures.

As heretofore suggested, one possible approach is to deploy a single centralized IAM database (DB) that is used for provisioning global access to a global IAM service that serves an entire availability zone (AZ). One problem with this approach is that, if that if the designated AZ that hosts the single centralized database become unreachable, then the global IAM service becomes unavailable to all constituents throughout the entire availability zone. Another approach is to deploy a distributed DB into several different availability zones. The problem with this approach is the indeterministic behavior that arises when merging data across the several distributed DB s in the several different AZs.

Improved approaches that address these and other problems that arise in the context of hybrid topologies are further disclosed hereunder.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A shows deployment of a system having two fully-functional IAM services in a master/non-master relationship. The figure includes a depiction of the system at time=T0, at which time there is only one computing node, specifically the shown centralized master node $110_M$. At time=T0, that one centralized master node $110_M$ hosts the shown master IAM database $104_M$. As such, the master IAM database $104_M$ serves all requests arising from anywhere in its availability zone.

Upon some event such as addition of a new, to-be-configured ROBO, steps are taken to initialize a non-master IAM service. This is shown at time=T1, when a non-master node $111_0$ is deployed. Also, at time=T1 and as shown, a non-master copy of the master IAM database $104_M$ is deployed into a non-master node $111_0$ for use by the non-master IAM database $104_{NM}$. As of time T1 and later, the former centralized master node is no longer centralized, at least to the extent that there is a distributed copy of the IAM database on a different node.

Next, at time=T2, the centralized master node $110_M$ and the non-master node $111_0$ interact between themselves to perform steps involved in ongoing coordination 114 of changes made either at the master IAM database $104_M$ or at the non-master IAM database $104_{NM}$.

The foregoing can be carried out in any of a variety of topologies and/or under a variety of conditions. In one particular topology involving multiple data centers that are situated in multiple availability zones is shown and discussed as pertains to FIG. 1B.

Figure 1B:
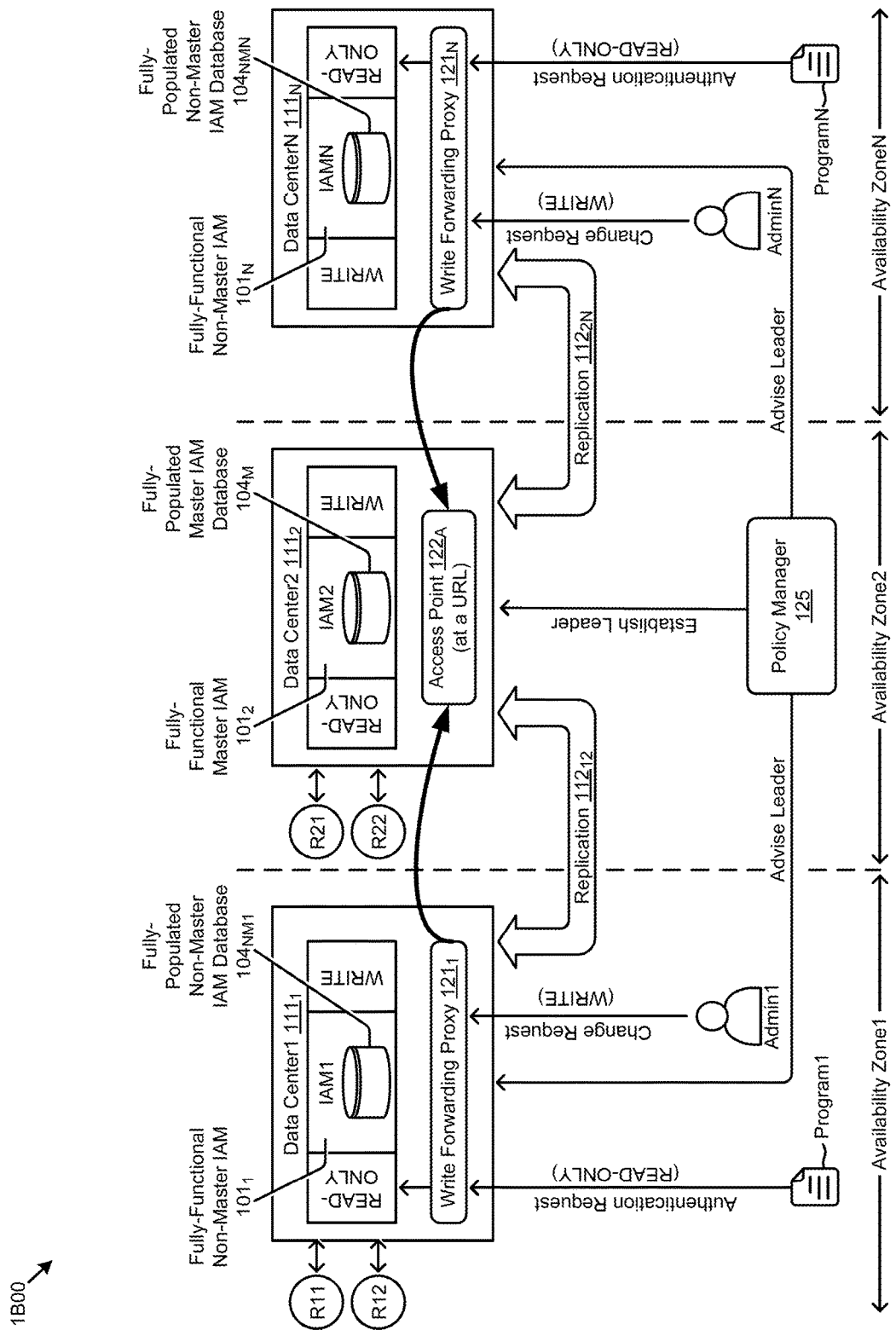
FIG. 1B exemplifies a high-availability deployment in a hierarchy involving multiple IAM services in communication across multiple availability zones, according to an embodiment.

FIG. 1B exemplifies a high-availability deployment 1B00 in a hierarchy involving multiple IAM services in communication across multiple availability zones. As an option, one or more variations of high-availability deployment 1B00 or any aspect thereof may be implemented in the context of the architecture and functionality of the embodiments described herein. The high-availability deployment 1B00 or any aspect thereof may be implemented in any environment.

This figure is being presented to shown how an initial fully-functional master IAM $101_2$, with a corresponding fully-populated master IAM database $104_M$ can be replicated into other availability zones so as to configure a high-availability and high-performance IAM. Specifically, the figure depicts operations and structures that serve for (a) bringing up fully-functional non-master IAMs in different availability zones (e.g., fully-functional non-master IAM $101_1$, and fully-functional non-master IAM $101_N$); and for (b) establishing ongoing coordination between the master and any non-master IAMs.

As shown, data center1 $111_1$, data center2 $111_2$, and data centerN $111_N$ are deployed in a topology that spans across several availability zones (e.g., availability zone1, availability zone2, availability zoneN). An initial identity authentication management service (e.g., IAM2) is established on a given computing node within the group of computing nodes. This initial identity authentication management service may serve any number of ROBOs. In this example, IAM2 serves ROBO R21 and ROBO R22. Upon occurrence of some event such as addition of a new, to-be-configured data center in a different availability zone, steps are taken to bring-up a non-master IAM service. This can happen at any moment in time when conditions are present that admit configuring the initial identity authentication management service in conjunction with a peer that is in a different availability zone.

In one particular set of circumstances, addition of one or more new data centers to the group is a condition that admits configuring the identity authentication management service as a high-availability service. This is shown in FIG. 1B by the juxtaposition of fully-functional IAM1 and fully-functional IAMN, in communication with fully-functional IAM2. Each of fully-functional IAM1 and fully-functional IAMN have their own dedicated local IAM databases (e.g., fully-populated non-master IAM database $104_{NM1}$ and fully-populated non-master IAM database $104_{NMN}$), which become fully-populated with all IAM data. This is accomplished by operation of the first replication facility between the fully-functional IAM2 and the fully-functional IAM1 (e.g., replication $112_{12}$) and the second replication facility between fully-functional IAM2 and fully-functional IAMN (e.g., replication $112_{2N}$).

Any of the foregoing fully-functional IAMs are configured to perform at least, managing user passwords, establishing and/or changing a user's role, tracking user activities, creating reports on those activities, enforcing policies, administering user accesses to resources, ensuring compliance with corporate policies and government regulations, provisioning software, and monitoring the health of identity repositories.

One aspect of bringing up a new, to-be-configured non-master IAM in a different availability zone is the need for each of the master IAM and non-master IAM to unambiguously take on either a master role or a non-master role. This can be accomplished by any known method. Once the roles (master and non-master) are established, then the master can expose its service access point (e.g., via publishing a URL to its write forwarding proxy) and the non-master can bring-up its specially-configured write forwarding proxy. In some cases there are multiple non-masters, each with its respective specially-configured write forwarding proxy. Each instance of a write forwarding proxy (e.g., write forwarding proxy $121_1$ and write forwarding proxy $121_N$) is hosted at its respective node, and each instance of a write forwarding proxy is configured with the URL of the service access point at the master IAM (e.g., access point $122_A$). Moreover, each instance of a write forwarding proxy publishes its URL such that any local callers or ROBO callers (e.g., from ROBO R11 and/or ROBO R12) have local access to the IAM services. Since each non-master IAM is a fully-functional IAM, this means that local requests can be serviced locally—even if the master is "down" or for whatever reason unavailable.

Any instance of a write forwarding proxy can be interfaced to a local IAM database. Such interfacing includes establishment of a READ-ONLY connection to the database as well as a WRITE connection to the database. The write forwarding proxy can determine which IAM requests/commands are to be processed locally and which IAM requests/commands are to be processed alternatively or additionally at a different IAM. As an example, when an IAM request is received at a write forwarding proxy, then the write forwarding proxy determines which one of two possible connections to the IAM DB are to be used.

Strictly as an example, upon receipt of an IAM request or command that involves a WRITE the write forwarding proxy of a non-master IAM might forward the IAM request or command to the master IAM. If the request involves READ-ONLY operations, then the READ-ONLY connection is used, and the request is satisfied by using the locally-replicated instance of the IAM DB. This mechanism provides for high availability. For example, in case of an event such that the master IAM is not reachable for some duration, any node in any AZ can continue to work in READ-ONLY mode using local AZ data. During this duration, READ-ONLY requests can be satisfied locally from the IAM in the same AZ as the requestor, and hence, for READ-ONLY requests, the temporary lack of availability of IAM services from the master IAM does not severely impact ongoing operations. However, during this duration any IAM requests or commands that involve a WRITE are blocked from accessing the local database. The blocked commands can be queued (e.g., in a middleware component), or the blocked commands can be returned back to the sender with a status/failure indication.

In many cases, and as shown, authentication requests that involve only READ-ONLY operations over the database can be raised by any computing entity and/or by any user. Since such authentication requests that involve only READ-ONLY operations over the database locally, this provides for high-performance local authentication since the request can be serviced using the local fully-populated IAM database. Moreover, any sorts of READ-ONLY operations can be performed locally since the local IAM is a fully functional IAM (e.g., the shown fully-functional non-master IAM $101_1$ or the shown fully-functional non-master IAM $101_N$).

In many cases, and as shown, change requests that involve WRITE operations over the database can be raised by any user (e.g., an administrator) and/or any computing entity (e.g., program1, programN). WRITE operations are processed locally over the local IAM database. This provides for high-performance local WRITEs since the WRITE operation can be serviced using the local fully-populated IAM database without the need to carry out network operations to any other availability zone.

Determination of which particular node on which particular data center can be performed using any known technique. In some cases, and as shown, such a determination is facilitated using policy manager 125. Such a policy manager can aid in determination of which node is to host an IAM service when a non-master copy of a master IAM database is being created. A policy manager can be hosted at any node accessible from the various availability zones (e.g., availability zone1, availability zone2, availability zoneN). In some cases a policy manager can be employed to manage specific authorizations (e.g., to specific computing resources) in correspondence with specific authenticated entities. For example, a policy manager can specify that an authenticated entity that has an ADMIN privilege can access administrator-only computing resources that are not accessible by non-ADMIN users.

A policy manager can also be employed to aid in determining leader/follower relationships between nodes in different availability zones. In some cases (e.g., when there is a new configuration event such as adding a data center to the fabric), a policy manager can facilitate arbitration of leadership such that there can only be one leader to host a master IAM database (e.g., fully-populated master IAM database $104_M$), and all others are followers that host a non-master IAM database (e.g., fully-populated non-master IAM database $104_{NM1}$, fully-populated non-master IAM database $104_{NMN}$).

In some situations, a particular leader can remain a leader as additional followers are added. However, in other situations, a particular leader can take on a follower role when a different leader is elected. This situation is shown and discussed as pertains to FIG. 4.

Figure 2:
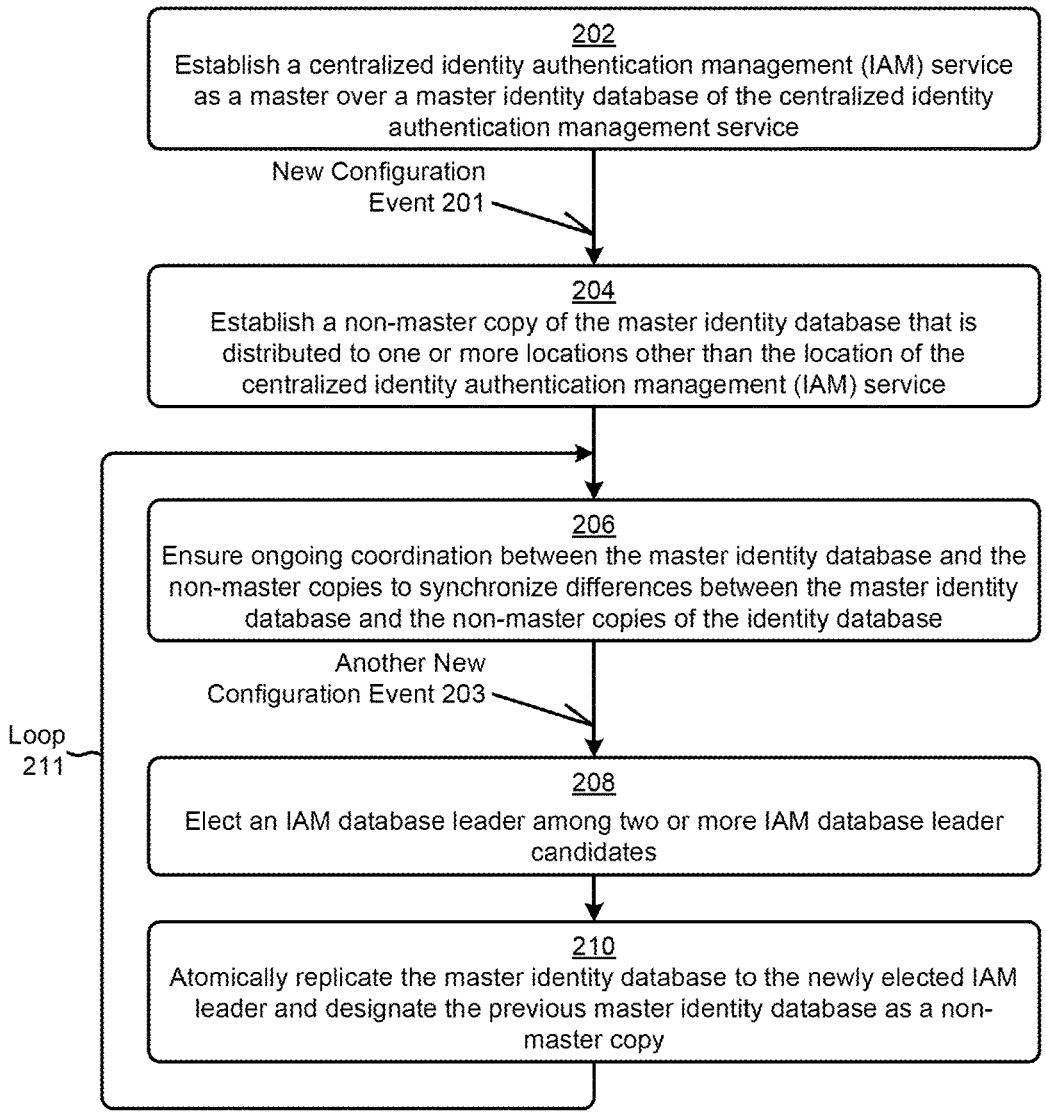
FIG. 2 shows a series of flows for implementing high-availability identity management services, according to an embodiment.

FIG. 2 shows a series of flows for implementing high-availability identity management services. As shown, the flow commences by establishing a centralized identity authentication management service as a master over a master identity database of the centralized identify authentication management service (step 202). Upon receipt of some new configuration event 201 (e.g., addition of a data center in a different availability zone), the flow proceeds to establish a non-master copy of the master identity database that is distributed to one or more locations other than the location of the centralized identity authentication management service (step 204). Initial coordination ensures that that the non-master stores a complete copy of the master identity database, and ongoing coordination ensures that changes to the master identity database are propagated to each non-master such that all non-master copies of the identity database become synchronized with the master identity database (step 206). Such synchronization may by operation of any one or more implementations of ongoing replication facilities (e.g., replication $112_{12}$, . . . replication $112_{2N}$). As shown, the replication facilities span across availability zones. In the example shown, a first replication facility (e.g., replication $112_{12}$) spans across availability zone1 and availability zone2, whereas a second replication facility (e.g., replication $112_{2N}$) spans across availability zone2 and availability zoneN.

At some point in time after performance of step 206, some event may be raised (e.g., another new configuration event 203) such that a further node is to be added for provision of fully-functional IAM services. In such a situation involving adding a further node for provision of IAM services, possibly in a different availability zone, further steps are undertaken to elect an IAM database leader from among two or more candidates (step 208). The elected leader can be the master of the previous configuration, or the elected leader can be a newly-elected master. Any known technique can be used to elect a leader from among candidates. In some cases election of a leader is influenced by characteristics (e.g., loading) of the nodes, and/or characteristics (e.g., geographic location) of the availability zones, and/or characteristics of the network infrastructure that exists between two availability zones.

Once a leader has been elected that leader is to operate as a fully-functional master IAM, and all of the non-leaders are to become fully-functional non-master IAMs. This can be accomplished by atomically replicating the (previous) master identity database to the newly elected IAM leader, and thereafter designating the (previous) master identity database as a non-master copy (step 210). The operations of step 206, step 208, and step 210 as well as the mechanism for responding to further configuration events can be carried out continuously. This is shown by loop 211.

The bring-up of the newly elected IAM leader includes establishing a write forwarding proxy at the newly elected IAM leader. The previous master already had an operational write forwarding proxy, which remains in operation even after the new leader begins to function in its role as an IAM database master. As such, all of the nodes that provide fully-functional IAM services after processing of still further incoming configuration events are configured to process READ-ONLY operations locally, and to process WRITE operations (e.g., IAM database change requests) in accordance with a flow such as is shown and described as pertains to FIG. 3.

Figure 3:
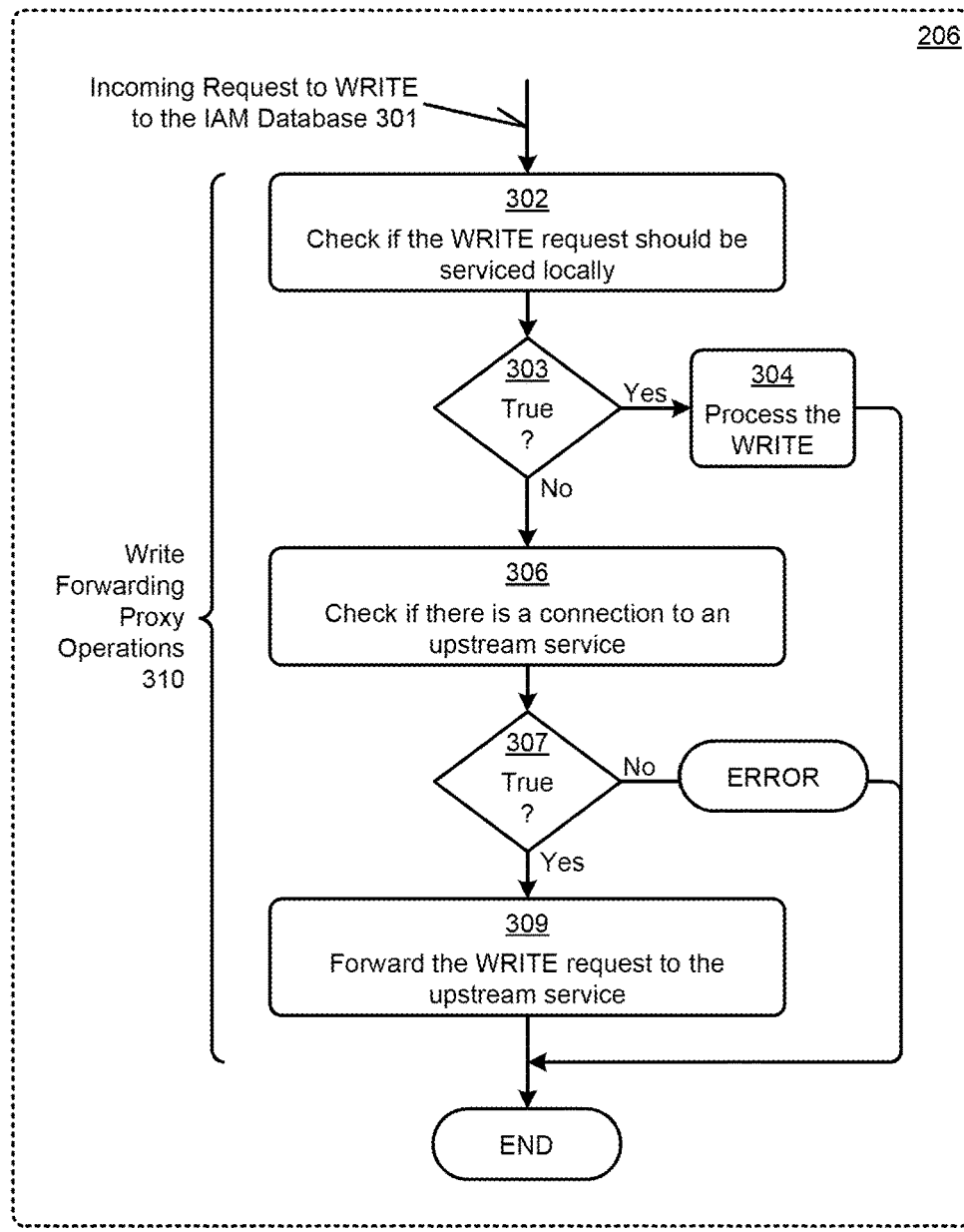
FIG. 3 shows an example write-forwarding proxy control flow operation for implementing identity management, according to an embodiment.

FIG. 3 shows an example write-forwarding proxy control flow operation 300 for implementing identity management. As an option, one or more variations of the write forwarding proxy control flow operations 300 may be implemented in the context of the architecture and functionality of the embodiments described herein. The write forwarding proxy control flow operations 300 or any aspect thereof may be implemented in any environment.

A write forwarding proxy is provided at each master and non-master node. The write forwarding proxy provides the function of an access point (e.g., a URL) such that local programs in the same availability zone can access corresponding fully-functional IAM services. The write forwarding proxy further provides the function of handling a change request (e.g., WRITE operations) locally as well as forwarding the change to an upstream service. In this manner, changes made to a non-master IAM database can be propagated to upstream IAM databases.

As shown, the forwarding proxy control flow operations commence upon receipt of an incoming request to WRITE to the IAM database (event 301). Detection of the incoming request to write to the IAM database initiates performance of the shown write forwarding proxy operations 310. Specifically, one or more checks/tests are performed to determine if the WRITE request is of a nature that the WRITE request should be processed locally at the local IAM database (step 302). If it is true (decision 303) that the WRITE should be processed locally at the local IAM database, then the processing flow proceeds to perform the WRITE at the local IAM database (step 304). However, if the WRITE request is not to be processed locally at the local IAM database, then a check/test is undertaken to determine if there is a connection to an upstream service (step 306). If there is a connection to an upstream service (e.g., the "YES" branch of decision 307), then the process forwards the WRITE request to the upstream service (step 309). If there is not a connection to an upstream service (e.g., the "NO" branch of decision 307), an error is raised and the process flow can then end so as to be entered again upon another incoming request to WRITE to the local IAM database.

Figure 4:
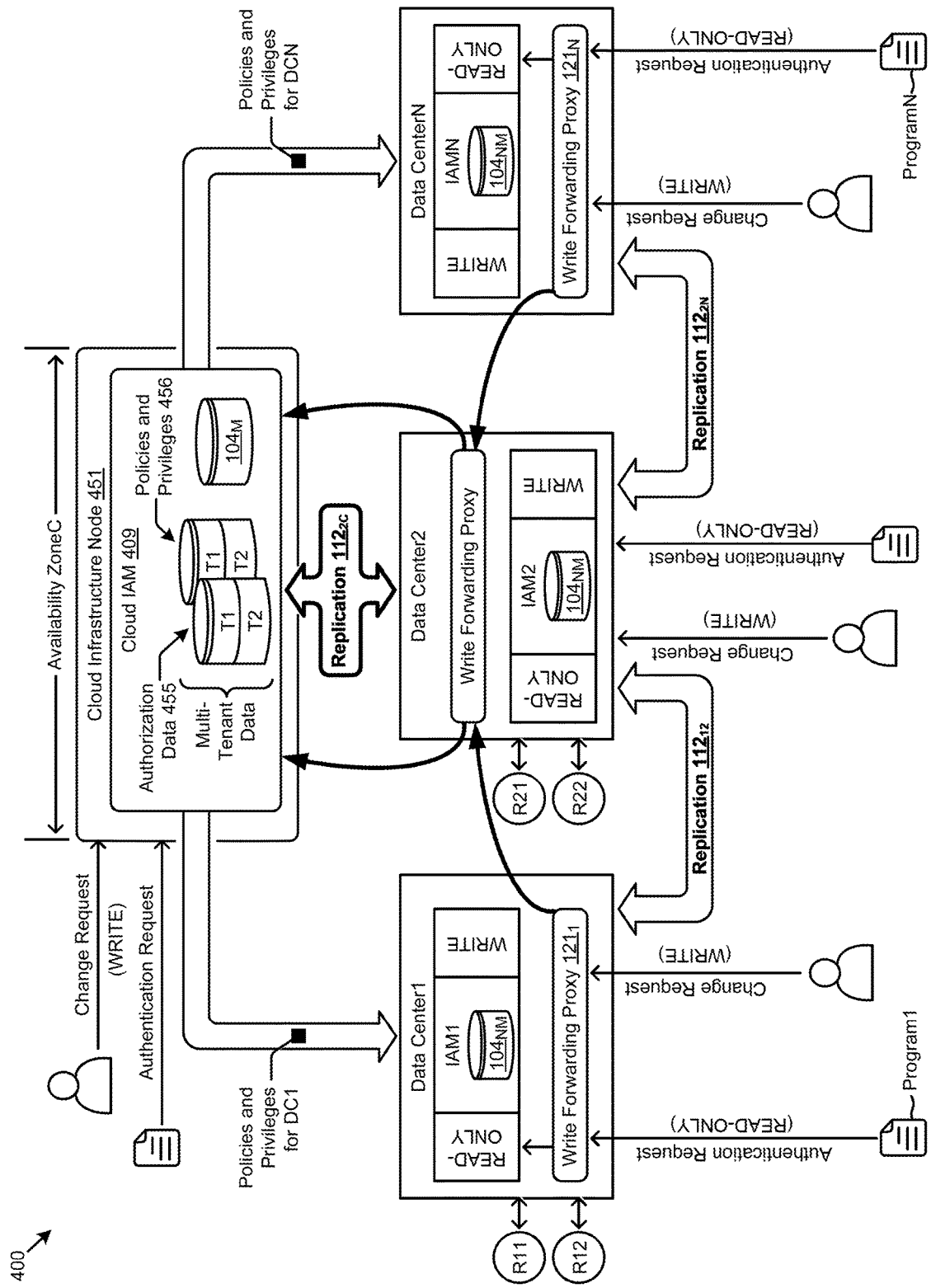
FIG. 4 exemplifies a high-availability deployment in a hybrid cloud setting involving multiple IAM services in communication with an elected IAM services master hosted at a multi-tenant cloud computing facility, according to an embodiment.

FIG. 4 exemplifies a high-availability deployment in a hybrid cloud setting 400 involving multiple IAM services in communication with an elected IAM service master hosted at a multi-tenant cloud computing facility. As an option, one or more variations of the high-availability deployment or any aspect of the hybrid cloud setting 400 may be implemented in the context of the architecture and functionality of the embodiments described herein. The high-availability deployment or any aspect thereof may be implemented in any environment.

As indicated above, conditions may be present or may be brought about under administrative control that admit configuration of a clone or replica of a fully-functional IAM to bring a new cloud-based IAM into a high-availability hybrid cloud configuration. In some cases, such administratively-raised conditions may include addition of, or connecting to, a cloud-based cluster (e.g., a public cloud or private cloud). Such conditions may cause the configuration of a replica instance of a fully-functional identity authentication management service in the cloud.

In bringing-up such a high-availability hybrid cloud configuration, at least one of the nodes (e.g., the node hosting IAM2) of the several nodes hosting IAM services recognizes occurrence of the administratively-raised conditions or other signals that are indicative of a cloud infrastructure node 451 being added to the initial topology. A computing agent running on at least one of the nodes of the topology of nodes recognizes the aforementioned occurrence and configures the cloud infrastructure node to become a master identity authentication management service (e.g., cloud IAM 409) on the cloud infrastructure node. Additionally, the computing agent exposes a URL of the master identity authentication management service. Specifically, the exposed URL is made accessible to any/all other nodes in the topology, including any nodes that are in different availability zones.

Any other nodes of the topology can thereafter forward IAM WRITE requests to the newly-configured master (e.g., cloud IAM 409) by accessing the exposed URL. Furthermore, the foregoing agent or another agent establishes a proxy service within the newly-configured master. This proxy service is configured to processes READ requests using the IAM service of the newly-configured master node and to forward WRITE requests to an upstream IAM service (if any, not shown). On an ongoing basis, identity authentication management service data of the master identity authentication management service is replicated to the initial identity authentication management service, as well as to any other identity authentication management services running on nodes in the topology.

As depicted, the new (master) identity authentication management service is situated in a availability zoneC. The other IAMs are in availability zones other than availability zoneC. In some situations, the newly-configured master (e.g., cloud IAM 409) might receive yet another new configuration event, and an agent running on the cloud infrastructure node (or any other node) can initiate activities of flow 200 (e.g., to elect a new IAM database leader and to replicate the identity database). The target node that is the elected leader can be situated in any availability zone, and can be a cloud infrastructure node from a different computing cloud, or can be a node from an on-premises computing cluster.

The mechanisms for implementing a hybrid cloud configuration exhibits high-performance and high-availability properties which in turn support several operational scenarios.

First Scenario: Single ROBO to Multiple ROBOs

Initially a single ROBO in a particular AZ can initially have its own IAM data—and can be its own master. When a second ROBO is brought up in the same or different AZ, a designated one of the ROBOs becomes the master and the other ROBO becomes a non-master. The IAM data of the joining ROBO is merged with the other ROBO. Thereafter, all ROBOs joining the same AZ initiate ongoing replication of IAM data from the master. In this scenario, all writes happen only into the master database. The master and non-master databases are synchronized by operation of any one or more implementations of ongoing replication facilities Second Scenario: Implementing a First Cloud-Based Master IAM A master site is configured to be connected to a public cloud service. Tenant data (including the IAM data from the master) is replicated (e.g., using replication $112_{2C}$) from the master to a node of the public cloud where IAM services are to be hosted. After replication of the tenant data is complete, the newly-configured and newly-populated cloud-based IAM service becomes the master. Any tenant specific data from the public cloud is replicated into non-master AZs throughout the topology. This can be accomplished by using replication $112_{12}$, and/or using replication $112_{2N}$, and/or through use of any other replication mechanism.

Third Scenario: Implementing a New On-Premises Cluster Based on a Cloud-Based Master IAM A node of an on-premises cluster replicates data from a cloud-based master IAM. Such replication may involve partitioning, such as when the cloud-based master IAM hosts data from multiple tenants. During partitioning and replication, all AZs can continue to work off of their own copy of their own IAM data.

In any or all of the foregoing scenarios, all application code instances can continue to use their local IAM endpoint for both WRITEs and READs, even though the proxy will determine whether to use local IAM services or whether to use upstream services of the then-current master. The proxies can be configured to handle any configuration of any type or combination of types of clouds.

Still further, in a multi-tenancy situation, (e.g., where, for example, each of "Coke" and "Pepsi" would have their own IAM service and database) security must be observed such that only the corresponding tenant's IAM data is replicated to that particular tenant's ROBO sites. Moreover, in addition to the IAM data, for purposes of disaster recovery, the herein-disclosed implementations selectively replicate any authorization data 455 and/or any other policies and/or privileges such that in the event of a disaster, the replicated authorization data and replicated policies and/or privileges can be restored. This is shown by movement of policies and privileges 456 for DC1 going only to data center1 $111_1$ and by movement of policies and privileges for DCN going only to data centerN $111_N$.

Additionally, in the context of virtualized systems, there are many policies and privileges that are specific to privileges covering accessing and modifying VMs. In the context of cloud systems, especially multi-tenant cloud settings, only certain IAM authentication/privileges need to be replicated from the cloud to data center or ROBO nodes.

Figure 5:
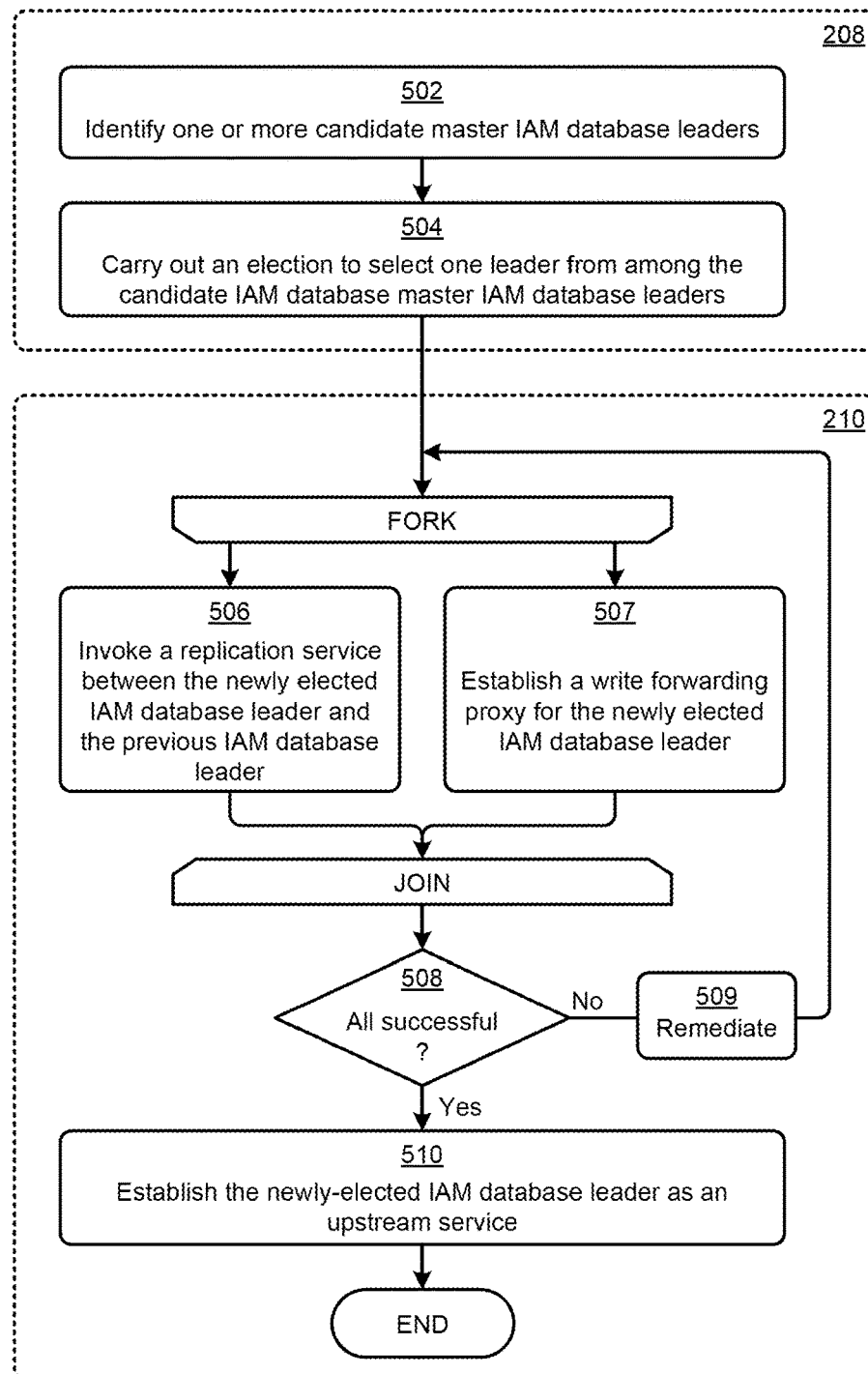
FIG. 5 shows example flow operations for implementing identity management in hybrid cloud settings, according to an embodiment.

FIG. 5 shows example flow operations 500 for implementing identity management in hybrid cloud settings. As an option, one or more variations of the example flow operations 500 may be implemented in the context of the architecture and functionality of the embodiments described herein. The example flow operations 500 or any aspect thereof may be implemented in any environment.

An administrative request to bring-up an additional IAM service (e.g., in a new availability zone) can be raised at any moment in time. Accordingly some technique needs to be defined to bring in and bring up an additional IAM service into the topology. There are often many good candidate nodes in a computing setting (e.g., in a data center setting or in a cloud computing setting). Accordingly, various steps need to be carried out to (1) choose a node to be the elected master/leader node, (2) establish a soon-to-become master copy of the IAM data at the designated master/leader node, and (3) establish agreement by all non-masters that the leader is the IAM master in that topology.

As shown, step 502 and step 504 combine as one possible implementation of electing a node to be designated as the master/leader. Inasmuch as a computing setting (e.g., a data center setting or a cloud computing setting) might be composed of multiple computing nodes, some means for selecting one node from many nodes is to be defined. In certain situations, the mechanism for selecting one node from many nodes involves optimizing on the basis of node constraints (e.g., CPU headroom, available storage area, etc.) and some optimization function. In other situations, the mechanism for selecting one node from many nodes involves optimizing on the basis of networking infrastructure into and out of candidate nodes. In still other situations, a candidate node might be designated by an administrative action. Regardless of the particular mechanism to selecting one node from many nodes, the selected node does not take on the leadership within the topology until the other IAMs agree to some particular leader/follower or master/non-master relationship. Moreover, both establishing the to-become master IAM as the leader as well as establishing the newly-configured forward write proxy need to be successfully accomplished before the to-become master IAM can actually perform as a leader/master.

Accordingly a FORK/JOIN block is established to replicate the IAM data to the soon-to-be-leader (fork operation 506) and configure a new instance of a forward write proxy at the soon-to-be-leader (fork operation 507). When both fork operations have completed, the threads are JOINed and a test is undertaken to determine if both fork operations were indeed successful. If either one or both fork operations failed, then the "No" branch of decision 508 is taken, the failure is remediated (step 509), and the FORK/JOIN block is entered again. On the other hand, if both fork operations were indeed successful, then the "Yes" branch of decision 508 is taken and the newly-elected and newly (successfully) configured IAM database leader is designated as an upstream service (step 510).

Any of the foregoing embodiments can be implemented in whole or in part by one or more virtualized controllers. Various embodiments of such virtualized controllers are shown and described as pertains to FIG. 7A, 7B, FIG. 7C, and FIG. 7D.

Computer Code Examples

Figure 6:
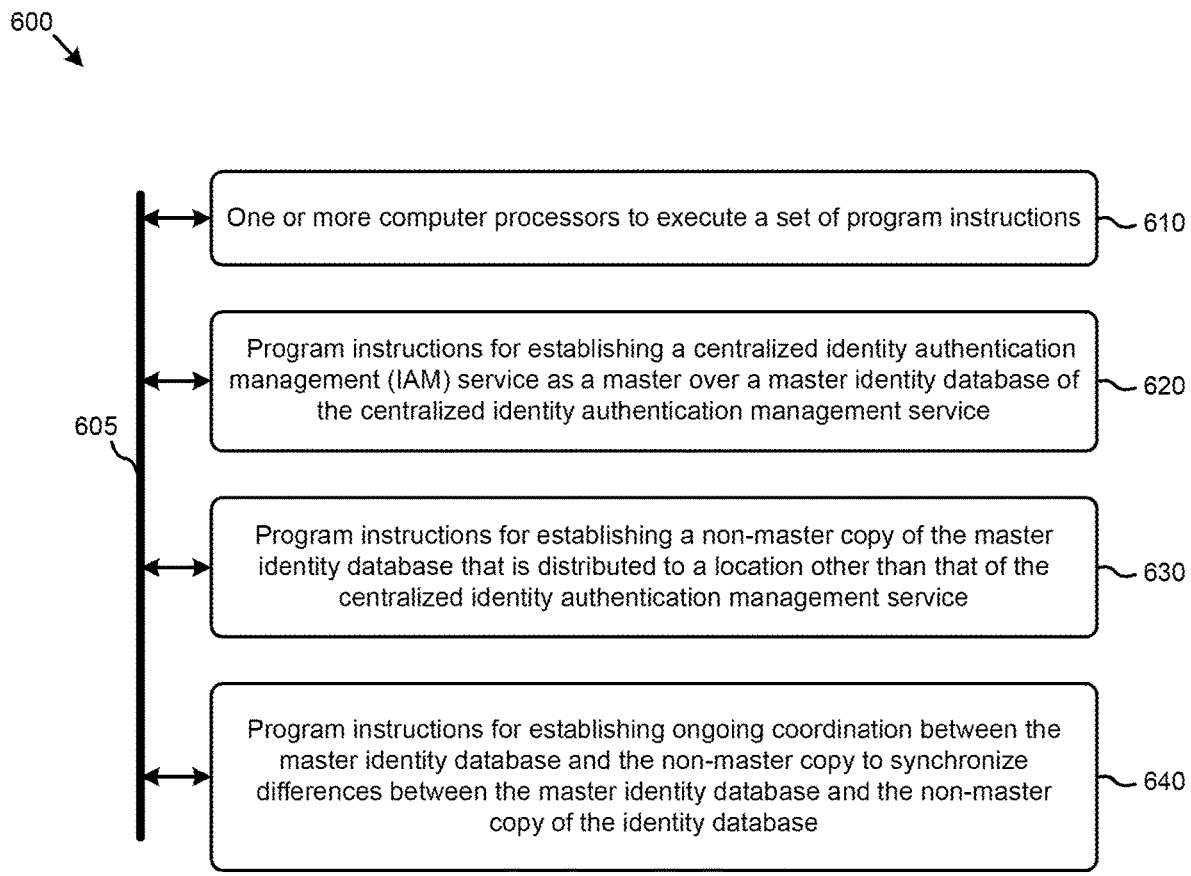
FIG. 6 depicts system components as arrangements of computing modules that are interconnected so as to implement certain of the herein-disclosed embodiments.

FIG. 6 depicts system components as arrangements of computing modules that are interconnected so as to implement certain of the herein-disclosed embodiments. FIG. 6 depicts a block diagram of a system to perform certain functions of a computer system. As an option, the system 600 may be implemented in the context of the architecture and functionality of the embodiments described herein. Of course, however, the system 600 or any operation therein may be carried out in any desired environment. The system 600 comprises at least one processor and at least one memory, the memory serving to store program instructions corresponding to the operations of the system. As shown, an operation can be implemented in whole or in part using program instructions accessible by a module. The modules are connected to a communication path 605, and any operation can communicate with any other operations over communication path 605. The modules of the system can, individually or in combination, perform method operations within system 600. Any operations performed within system 600 may be performed in any order unless as may be specified in the claims. The shown embodiment implements a portion of a computer system, presented as system 600, comprising one or more computer processors to execute a set of program code instructions (module 610) and modules for accessing memory to hold program code instructions to perform: establishing a centralized identity authentication management (IAM) service as a master over a master identity database of the centralized identity authentication management service (module 620); establishing a non-master copy of the master identity database that is distributed to a location other than that of the centralized identity authentication management service (module 630); and establishing ongoing coordination between the master identity database and the non-master copy to synchronize differences between the master identity database and the non-master copy of the identity database (module 640).

Additional System Architecture Examples

Figure 7A:
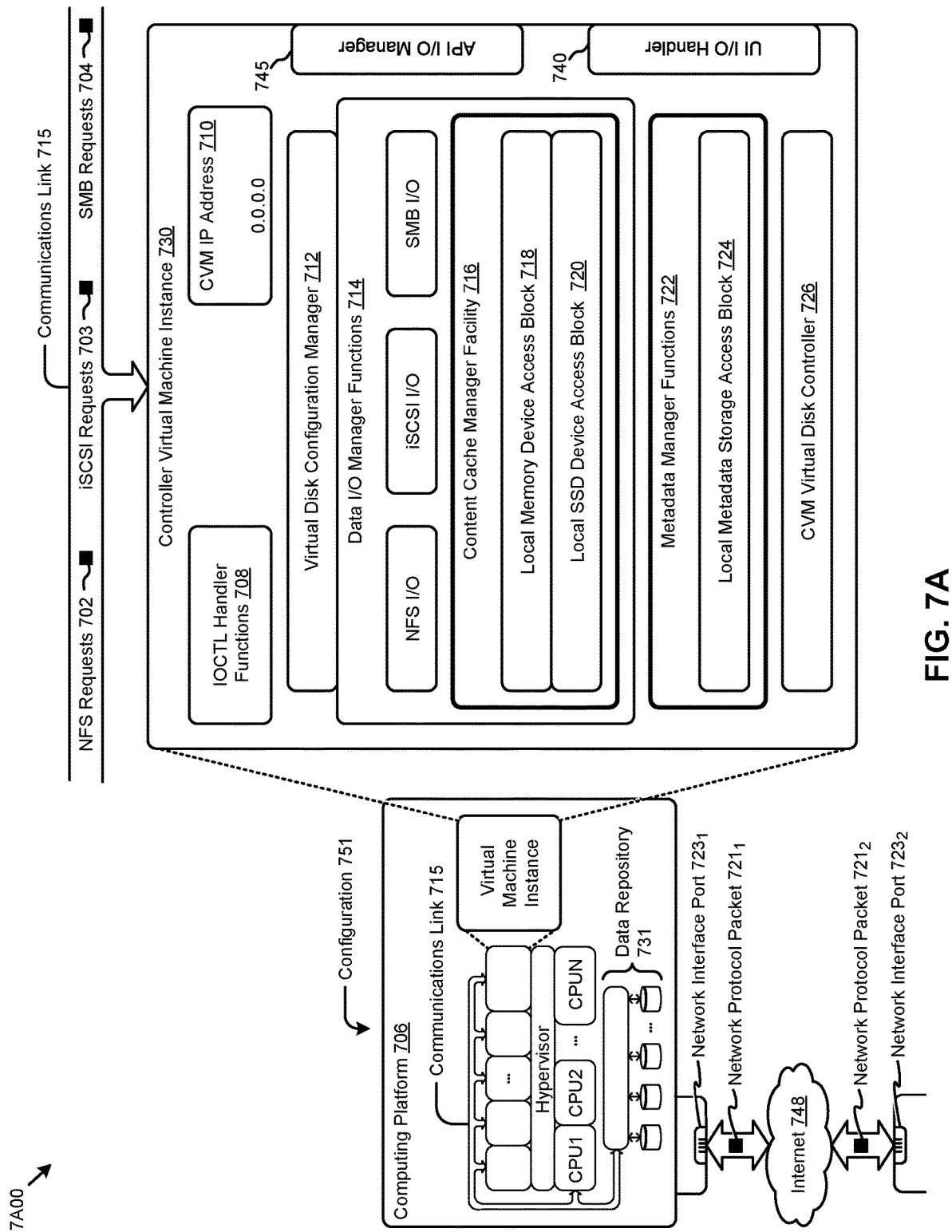
FIG. 7A, FIG. 7B, FIG. 7C, and FIG. 7D depict virtualization system architectures comprising collections of interconnected components suitable for implementing embodiments of the present disclosure and/or for use in the herein-described environments.

FIG. 7A depicts a virtualized controller as implemented by the shown virtual machine architecture 7A00. The heretofore-disclosed embodiments, including variations of any virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 7A00 comprises a collection of interconnected components suitable for implementing embodiments of the present disclosure and/or for use in the herein-described environments. Moreover, virtual machine architecture 7A00 includes a virtual machine instance in configuration 751 that is further described as pertaining to controller virtual machine instance 730. Configuration 751 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 730.

In this and other configurations, a controller virtual machine instance receives block I/O storage requests as network file system (NFS) requests in the form of NFS requests 702, and/or internet small computer storage interface (iSCSI) block IO requests in the form of iSCSI requests 703, and/or Samba file system (SMB) requests in the form of SMB requests 704. The controller virtual machine (CVM) instance publishes and responds to an internet protocol (IP) address (e.g., CVM IP address 710). Various forms of input and output can be handled by one or more IO control handler functions (e.g., IOCTL handler functions 708) that interface to other functions such as data IO manager functions 714 and/or metadata manager functions 722. As shown, the data IO manager functions can include communication with virtual disk configuration manager 712 and/or can include direct or indirect communication with any of various block IO functions (e.g., NFS TO, iSCSI TO, SMB TO, etc.).

In addition to block IO functions, configuration 751 supports IO of any form (e.g., block TO, streaming TO, packet-based TO, HTTP traffic, etc.) through either or both of a user interface (UI) handler such as UI IO handler 740 and/or through any of a range of application programming interfaces (APIs), possibly through API IO manager 745.

Communications link 715 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory. As shown, controller virtual machine instance 730 includes content cache manager facility 716 that accesses storage locations, possibly including local dynamic random access memory (DRAM) (e.g., through local memory device access block 718) and/or possibly including accesses to local solid state storage (e.g., through local SSD device access block 720).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 731, which in turn can be formatted into any one or more storage areas, and which can comprise parameterized storage accessible by a key (e.g., a filename, a table name, a block address, an offset address, etc.). Data repository 731 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 724. The data repository 731 can be configured using CVM virtual disk controller 726, which can in turn manage any number or any configuration of virtual disks.

Execution of a sequence of instructions to practice certain embodiments of the disclosure are performed by one or more instances of a software instruction processor, or a processing element such as a data processor, or such as a central processing unit (e.g., CPU1, CPU2, CPUN). According to certain embodiments of the disclosure, two or more instances of configuration 751 can be coupled by communications link 715 (e.g., backplane, LAN, PSTN, wired or wireless network, etc.) and each instance may perform respective portions of sequences of instructions as may be required to practice embodiments of the disclosure.

The shown computing platform 706 is interconnected to the Internet 748 through one or more network interface ports (e.g., network interface port $723_1$ and network interface port $723_2$). Configuration 751 can be addressed through one or more network interface ports using an IP address. Any operational element within computing platform 706 can perform sending and receiving operations using any of a range of network protocols, possibly including network protocols that send and receive packets (e.g., network protocol packet $721_1$ and network protocol packet $721_2$).

Computing platform 706 may transmit and receive messages that can be composed of configuration data and/or any other forms of data and/or instructions organized into a data structure (e.g., communications packets). In some cases, the data structure includes program instructions (e.g., application code) communicated through the Internet 748 and/or through any one or more instances of communications link 715. Received program instructions may be processed and/or executed by a CPU as it is received and/or program instructions may be stored in any volatile or non-volatile storage for later execution. Program instructions can be transmitted via an upload (e.g., an upload from an access device over the Internet 748 to computing platform 706). Further, program instructions and/or the results of executing program instructions can be delivered to a particular user via a download (e.g., a download from computing platform 706 over the Internet 748 to an access device).

Configuration 751 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 78 nodes. The former two LANs can be configured as subnets, or can be configured as one VLAN. Multiple clusters can communicate between one module to another over a WAN (e.g., when geographically distal) or a LAN (e.g., when geographically proximal).

As used herein, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to identity management in hybrid cloud settings. In some embodiments, a module may include one or more state machines and/or combinational logic used to implement or facilitate the operational and/or performance characteristics pertaining to identity management in hybrid cloud settings.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of identity management in hybrid cloud settings). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to identity management in hybrid cloud settings, and/or for improving the way data is manipulated when performing computerized operations pertaining to automatically managing multiple identity authentication services across multiple availability zones.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 7B:
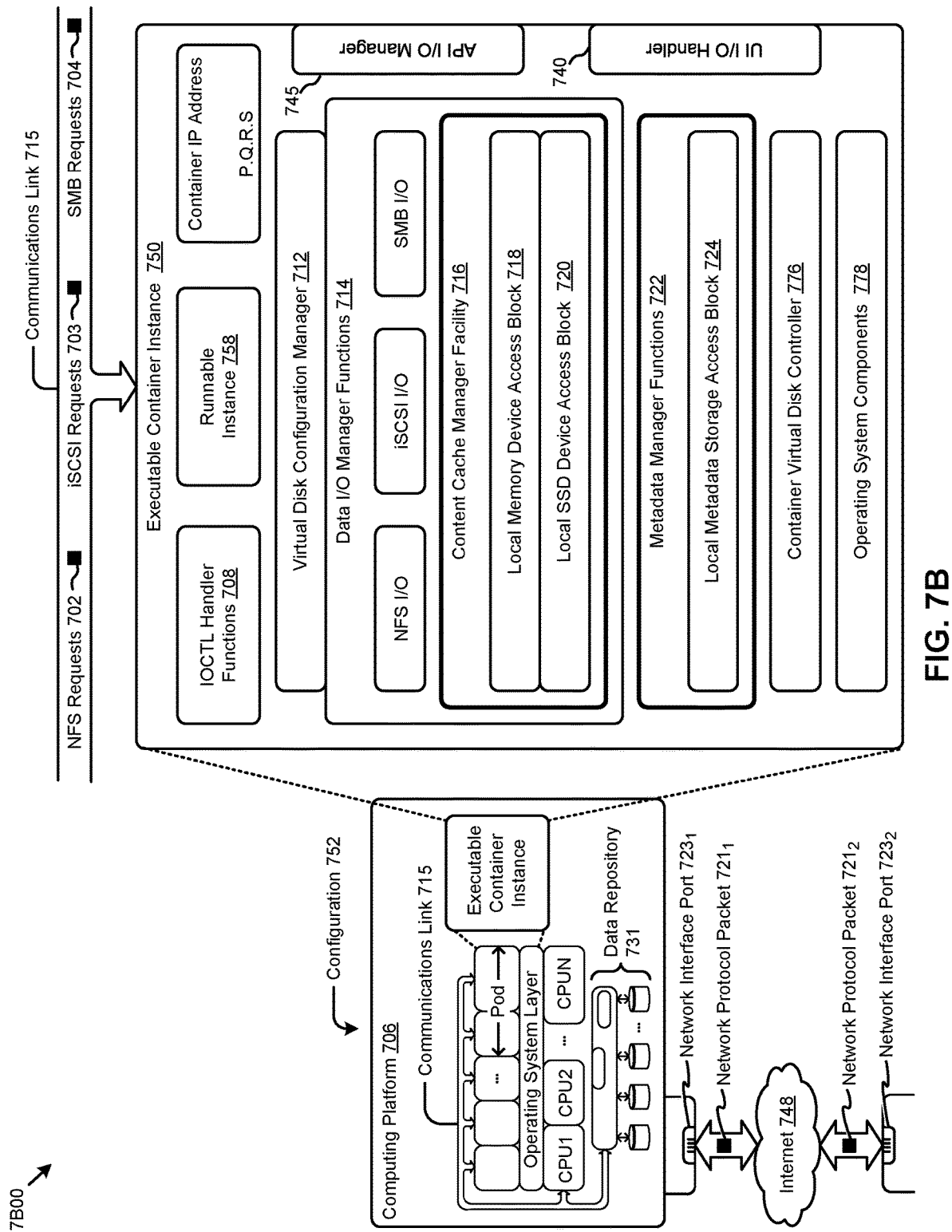

FIG. 7B depicts a virtualized controller implemented by containerized architecture 7B00. The containerized architecture comprises a collection of interconnected components suitable for implementing embodiments of the present disclosure and/or for use in the herein-described environments. Moreover, the shown containerized architecture 7B00 includes an executable container instance in configuration 752 that is further described as pertaining to executable container instance 750. Configuration 752 includes an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification (e.g., "http:") and possibly handling port-specific functions. In this and other embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 750). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance can serve as an instance of an application container or as a controller executable container. Any executable container of any sort can be rooted in a directory system and can be configured to be accessed by file system commands (e.g., "ls" or "ls —a", etc.). The executable container might optionally include operating system components 778, however such a separate set of operating system components need not be provided. As an alternative, an executable container can include runnable instance 758, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 776. Such a container virtual disk controller can perform any of the functions that the aforementioned CVM virtual disk controller 726 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 7C:
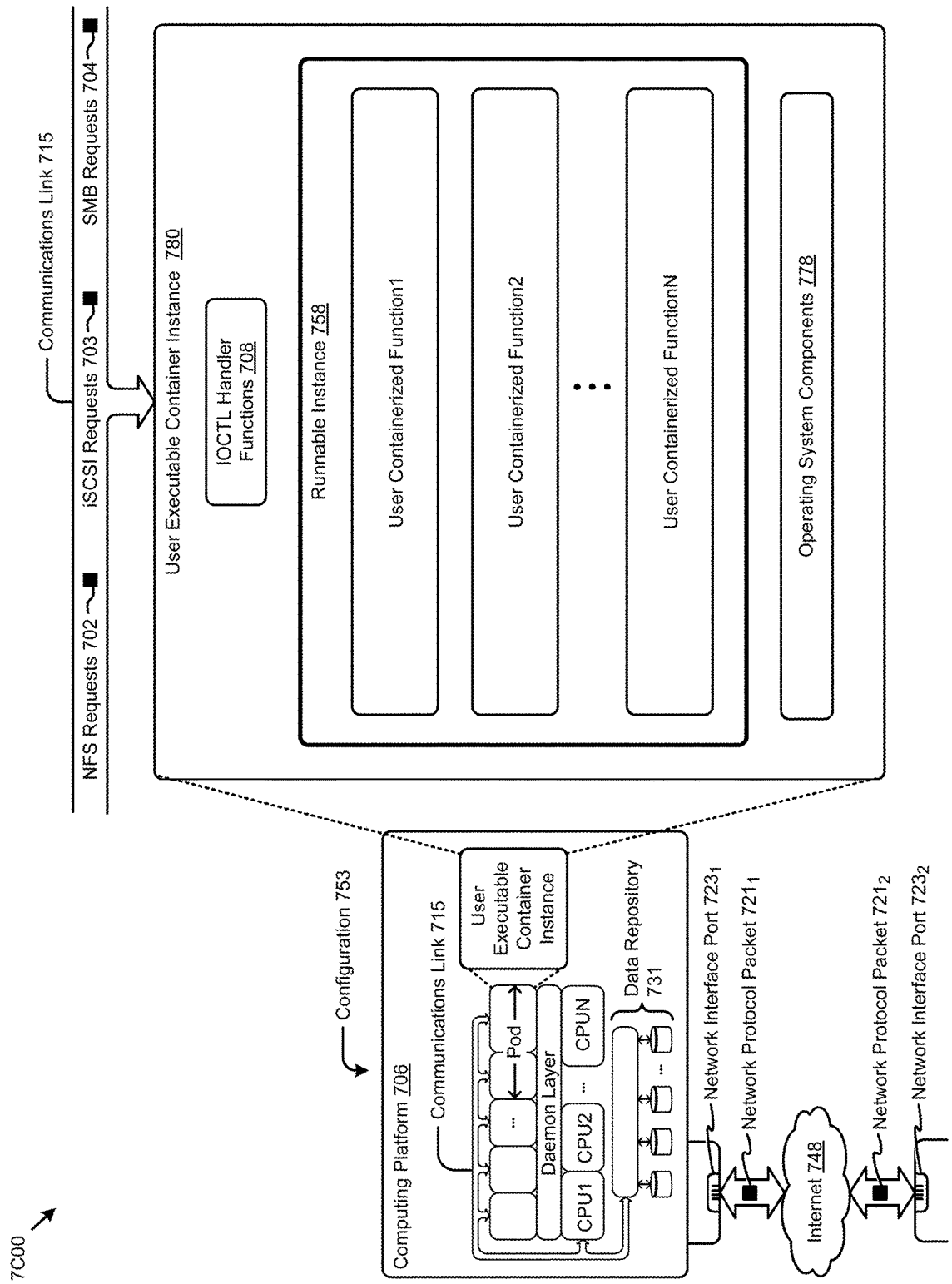

FIG. 7C depicts a virtualized controller implemented by a daemon-assisted containerized architecture 7C00. The containerized architecture comprises a collection of interconnected components suitable for implementing embodiments of the present disclosure and/or for use in the herein-described environments. Moreover, the shown daemon-assisted containerized architecture includes a user executable container instance in configuration 753 that is further described as pertaining to user executable container instance 780. Configuration 753 includes a daemon layer (as shown) that performs certain functions of an operating system.

User executable container instance 780 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 758). In some cases, the shown operating system components 778 comprise portions of an operating system, which portions are interfaced with or included in the runnable instance and/or any user containerized functions. In this embodiment of a daemon-assisted containerized architecture, the computing platform 706 might or might not host operating system components other than operating system components 778. More specifically, the shown daemon might or might not host operating system components other than operating system components 778 of user executable container instance 780.

The virtual machine architecture 7A00 of FIG. 7A and/or the containerized architecture 7B00 of FIG. 7B and/or the daemon-assisted containerized architecture 7C00 of FIG. 7C can be used in any combination to implement a distributed platform that contains multiple servers and/or nodes that manage multiple tiers of storage where the tiers of storage might be formed using the shown data repository 731 and/or any forms of network accessible storage. As such, the multiple tiers of storage may include storage that is accessible over communications link 715. Such network accessible storage may include cloud storage or networked storage (e.g., a SAN or storage area network). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term "vDisk" refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 751 of FIG. 7A) to manage the interactions between the underlying hardware and user virtual machines or containers that run client software.

Distinct from user virtual machines or user executable containers, a special controller virtual machine (e.g., as depicted by controller virtual machine instance 730) or as a special controller executable container is used to manage certain storage and I/O activities. Such a special controller virtual machine is referred to as a "CVM", or as a controller executable container, or as a service virtual machine (SVM), or as a service executable container, or as a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

Figure 7D:
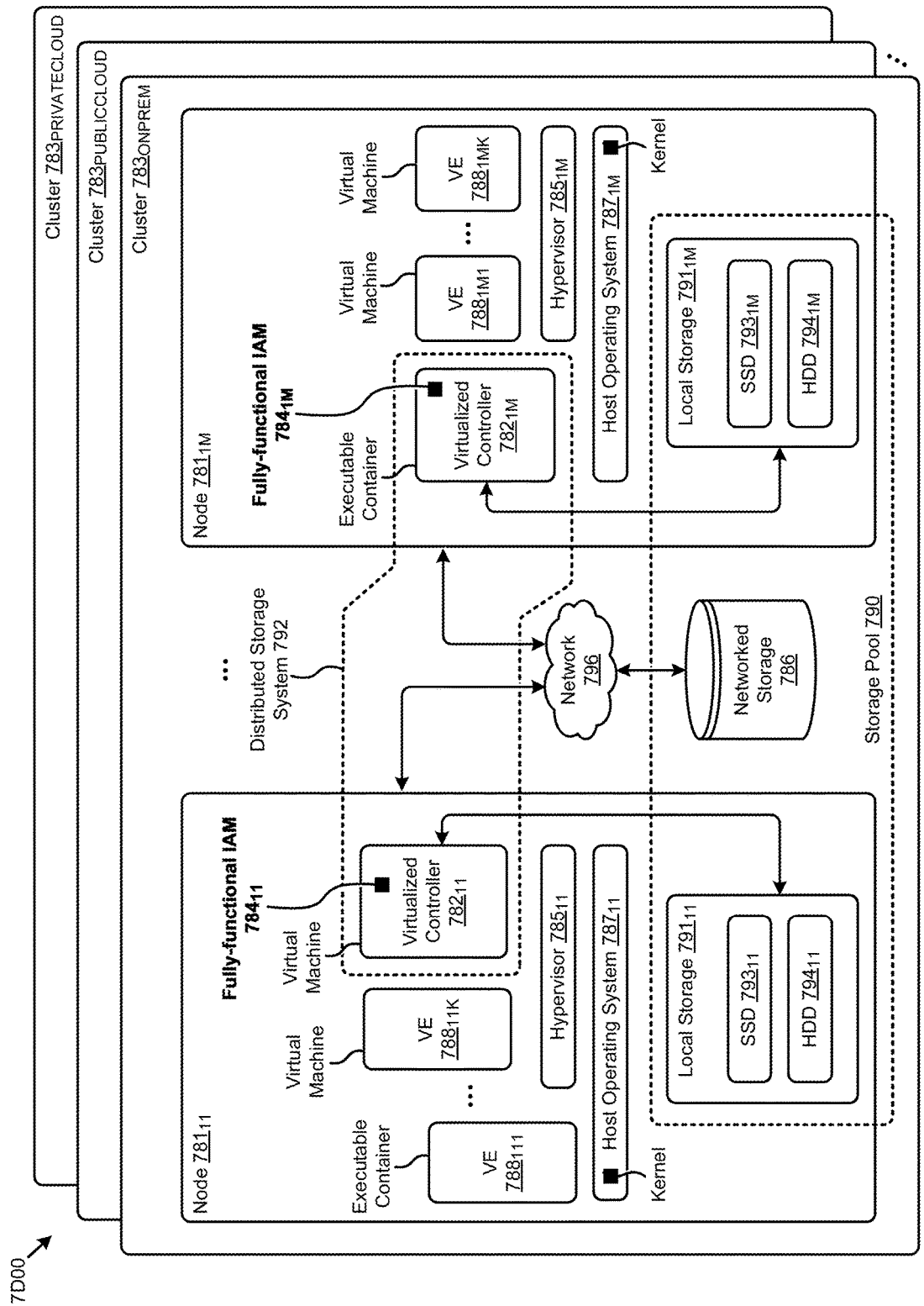

FIG. 7D depicts a distributed virtualization system in a multi-cluster environment 7D00. The shown distributed virtualization system is configured to be used to implement the herein disclosed techniques. Specifically, the distributed virtualization system of FIG. 7D comprises multiple clusters in a hybrid cloud setting (e.g., cluster $783_{ONPREM}$, cluster $783_{PUBLICCLOUD}$, cluster $783_{PRIVATECLOUD}$) comprising multiple nodes that have multiple tiers of storage in a storage pool. Representative nodes (e.g., node $781_{11}$, . . . , node $781_{1M}$) and storage pool 790 associated with cluster $783_{ONPREM}$ are shown. Each node can be associated with one server, multiple servers, or portions of a server. The nodes can be associated (e.g., logically and/or physically) with the clusters. As shown, the multiple tiers of storage include storage that is accessible through a network 796, such as a networked storage 786 (e.g., a storage area network or SAN, network attached storage or NAS, etc.). The multiple tiers of storage further include instances of local storage (e.g., local storage $791_{11}$, local storage $791_{1M}$). For example, the local storage can be within or directly attached to a server and/or appliance associated with the nodes. Such local storage can include solid state drives (SSD $793_{11}$, . . . , SSD $793_{1M}$), hard disk drives (HDD $794_{11}$, . . . , HDD $794_{1M}$), and/or other storage devices.

As shown, any of the nodes of the distributed virtualization system can implement one or more user virtualized entities (e.g., VE $788_{111}$, . . . , VE $788_{11K}$, VE $788_{1M1}$, . . . , VE $788_{1MK}$), such as virtual machines (VMs) and/or executable containers. The VMs can be characterized as software-based computing "machines" implemented in a container-based or hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $787_{11}$, . . . , host operating system $787_{1M}$), while the VMs run multiple applications on various respective guest operating systems. Such flexibility can be facilitated at least in part by a hypervisor (e.g., hypervisor $785_{11}$, . . . , hypervisor $785_{1M}$), which hypervisor is logically located between the various guest operating systems of the VMs and the host operating system of the physical infrastructure (e.g., node).

As an alternative, executable containers may be implemented at the nodes in an operating system-based virtualization environment or in a containerized virtualization environment. The executable containers are implemented at the nodes in an operating system virtualization environment or container virtualization environment. The executable containers comprise groups of processes and/or resources (e.g., memory, CPU, disk, etc.) that are isolated from the node host computer and other containers. Such executable containers directly interface with the kernel of the host operating system (e.g., host operating system $787_{11}$, . . . , host operating system $787_{1M}$) without, in most cases, a hypervisor layer. This lightweight implementation can facilitate efficient distribution of certain software components, such as applications or services (e.g., micro-services). Any node of a distributed virtualization system can implement both a hypervisor-assisted virtualization environment and a container virtualization environment for various purposes. Also, any node of a distributed virtualization system can implement any one or more types of the foregoing virtualized controllers so as to facilitate access to storage pool 790 by the VMs and/or the executable containers.

Multiple instances of such virtualized controllers can coordinate within a cluster to form the distributed storage system 792 which can, among other operations, manage the storage pool 790. This architecture further facilitates efficient scaling in multiple dimensions (e.g., in a dimension of computing power, in a dimension of storage space, in a dimension of network bandwidth, etc.).

A particularly-configured instance of a virtual machine at a given node can be used as a virtualized controller in a hypervisor-assisted virtualization environment to manage storage and I/O (input/output or IO) activities of any number or form of virtualized entities. For example, the virtualized entities at node $781_{11}$ can interface with a controller virtual machine (e.g., virtualized controller $782_{11}$) through hypervisor $785_{11}$ to access data of storage pool 790. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 792. For example, a hypervisor at one node in the distributed storage system 792 might correspond to software from a first vendor, and a hypervisor at another node in the distributed storage system 792 might correspond to a second software vendor. As another virtualized controller implementation example, executable containers can be used to implement a virtualized controller (e.g., virtualized controller $782_{1M}$) in an operating system virtualization environment at a given node. In this case, for example, the virtualized entities at node $781_{1M}$ can access the storage pool 790 by interfacing with a controller container (e.g., virtualized controller $782_{1M}$) through hypervisor $785_{1M}$ and/or the kernel of host operating system $787_{1M}$.

In certain embodiments, one or more instances of a fully-functional IAM can be implemented in the distributed storage system 792 to facilitate the herein disclosed techniques. Specifically, a fully-functional IAM (e.g., fully-functional IAM $784_{11}$) can be implemented in the virtualized controller $782_{11}$, and a local clone of a fully-functional IAM (e.g., fully-functional IAM $784_{1M}$) can be implemented in the virtualized controller $782_{1M}$. Instances of any fully-functional IAM can be implemented in any node in any cluster, including in different clusters of different architectures (e.g., in a public cloud, in a private cloud, etc.). Actions taken by one or more instances of the virtualized controller can apply to a node (or between nodes), and/or to a cluster (or between clusters), and/or between any resources or subsystems accessible by the virtualized controller or components of their embedded fully-functional IAMs. Strictly as one example, virtualized controller at one node can perform replication functions (e.g., over IAM data) in conjunction with a virtualized controller at another node. The two nodes can be situated in the same cluster or they can be situated in different clusters.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A non-transitory computer readable medium having stored thereon a sequence of instructions which, when stored in memory and executed by a processor cause the processor to perform acts for identity management, the acts comprising:
   determining a centralized identity authentication management service for a master identity database of the centralized identity authentication management service on a master node;
   establishing a non-master copy of the master identity database that is distributed to a non-master node other than the master node;
   establishing ongoing coordination between the master identity database and the non-master copy to synchronize differences between the master identity database and the non-master copy, wherein the differences correspond to at least one data change that is made locally to the non-master copy and is propagated to the master identity database; and
   replicating, using a replication facility, at least a policy between a cloud infrastructure node and the non-master node that hosts the non-master copy in a first availability zone, wherein the master node is in a second availability zone.

2. The non-transitory computer readable medium of claim 1, further comprising instructions which, when stored in memory and executed by the processor cause the processor to perform further acts of:
   exposing a uniform resource locator (URL) of the centralized identity authentication management service configured to receive a WRITE request from the non-master node that hosts the non-master copy.

3. The non-transitory computer readable medium of claim 1, further comprising instructions which, when stored in memory and executed by the processor cause the processor to perform further acts of:
   establishing a proxy service within the non-master node, the proxy service configured to process a READ request using the identity authentication management service of the non-master node and configured to forward a WRITE request to the centralized identity authentication management service.

4. The non-transitory computer readable medium of claim 1, wherein the policy pertains to granting an access to a resource to an identity managed by the centralized identification management service.

5. The non-transitory computer readable medium of claim 4, further comprising instructions which, when stored in memory and executed by the processor cause the processor to perform further acts of:
   deploying a replication facility that performs ongoing coordination between the master identity database in the first availability zone and the non-master identity database in the second availability zone.

6. The non-transitory computer readable medium of claim 1, further comprising instructions which, when stored in memory and executed by the processor cause the processor to perform further acts of:
   recognizing an occurrence of a cloud infrastructure node being added and configuring a copy of the master identity database on the cloud infrastructure node.

7. The non-transitory computer readable medium of claim 6, further comprising instructions which, when stored in memory and executed by the processor cause the processor to perform further acts of:
   deploying the replication facility, wherein the replication facility replicates the policy from the cloud infrastructure node to the non-master node that hosts the non-master copy.

8. The non-transitory computer readable medium of claim 6, wherein a virtual machine running on the cloud infrastructure node is authenticated by the centralized identity authentication management service on the cloud infrastructure node.

9. A method for identity management, the method comprising:
   determining a centralized identity authentication management service for a master identity database of the centralized identity authentication management service on a master node;
   establishing a non-master copy of the master identity database that is distributed to a non-master node other than the master node;
   establishing ongoing coordination between the master identity database and the non-master copy to synchronize differences between the master identity database and the non-master copy, wherein the differences correspond to at least one data change that is made locally to the non-master copy and is propagated to the master identity database; and
   replicating, using a replication facility, at least a policy between a cloud infrastructure node and the non-master node that hosts the non-master copy in a first availability zone, wherein the master node is in a second availability zone.

10. The method of claim 9, further comprising exposing a uniform resource locator (URL) of the centralized identity authentication management service configured to receive a WRITE request from the non-master node that hosts the non-master copy.

11. The method of claim 9, further comprising:
    establishing a proxy service within the non-master node, the proxy service configured to process a READ request using the identity authentication management service of the non-master node and configured to forward a WRITE request to the centralized identity authentication management service.

12. The method of claim 9, wherein the policy pertains to granting an access to a resource to an identity managed by the centralized identification management service.

13. The method of claim 12, further comprising:
    deploying a replication facility that performs ongoing coordination between the master identity database in the first availability zone and the non-master identity database in the second availability zone.

14. The method of claim 9, further comprising:
    recognizing an occurrence of a cloud infrastructure node being added and configuring a copy of the master identity database on the cloud infrastructure node.

15. The method of claim 14, further comprising:
    deploying the replication facility, wherein the replication facility replicates the policy from the cloud infrastructure node to the non-master node that hosts the non-master copy.

16. The method of claim 14, wherein a virtual machine running on the cloud infrastructure node is authenticated by the master centralized identity authentication management service on the cloud infrastructure node.

17. A system for identity management, the system comprising:
    a storage medium having stored thereon a sequence of instructions; and a processor that executes the sequence of instructions to cause the processor to perform acts comprising,
  determining a centralized identity authentication management service for a master identity database of the centralized identity authentication management service on a master node;
  establishing a non-master copy of the master identity database that is distributed to a non-master node other than the master node;
  establishing ongoing coordination between the master identity database and the non-master copy to synchronize differences between the master identity database and the non-master copy, wherein the differences correspond to at least one data change that is made locally to the non-master copy and is propagated to the master identity database; and
  replicating, using a replication facility, at least a policy between a cloud infrastructure node and the non-master node that hosts the non-master copy in a first availability zone, wherein the master node is in a second availability zone.

18. The system of claim 17, further comprising instructions which, when stored in memory and executed by the processor cause the processor to perform further acts of:
  exposing a uniform resource locator (URL) of the centralized identity authentication management service configured to receive a WRITE request from the non-master node that hosts the non-master copy.

19. The system of claim 17, further comprising instructions which, when stored in memory and executed by the processor cause the processor to perform further acts of:
  establishing a proxy service within a given computing node, the proxy service configured to process a READ request using the identity authentication management service of the non-master node and configured to forward a WRITE request to the centralized identity authentication management service.

20. The system of claim 17, wherein the policy pertains to granting an access to a resource to an identity managed by the centralized identification management service.

21. The system of claim 20, further comprising instructions which, when stored in memory and executed by the processor cause the processor to perform further acts of:
  deploying a replication facility that performs ongoing coordination between the master identity database in the first availability zone and the non-master identity database in the second availability zone.

22. The system of claim 17, further comprising instructions which, when stored in memory and executed by the processor cause the processor to perform further acts of:
  recognizing an occurrence of a cloud infrastructure node being added and configuring a copy of the master identity database on the cloud infrastructure node.

23. The system of claim 22, further comprising instructions which, when stored in memory and executed by the processor cause the processor to perform further acts of:
  deploying the replication facility, wherein the replication facility replicates the policy from the cloud infrastructure node to the non-master node that hosts the non-master copy.

24. The system of claim 22, wherein a virtual machine running on the cloud infrastructure node is authenticated by the centralized identity authentication management service on the cloud infrastructure node.

* * * * *